(12) United States Patent
Li et al.

(10) Patent No.: US 9,570,218 B2
(45) Date of Patent: Feb. 14, 2017

(54) PASTE FOR NFC MAGNETIC SHEET, METHOD OF PREPARING THE SAME, AND NFC MAGNETIC SHEET

(71) Applicant: BYD COMPANY LIMITED, Shenzhen (CN)

(72) Inventors: Hua Li, Shenzhen (CN); Shaolong Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/416,143

(22) PCT Filed: Aug. 8, 2013

(86) PCT No.: PCT/CN2013/081070
§ 371 (c)(1),
(2) Date: Jan. 21, 2015

(87) PCT Pub. No.: WO2014/032506
PCT Pub. Date: Mar. 6, 2014

(65) Prior Publication Data
US 2015/0235746 A1 Aug. 20, 2015

(30) Foreign Application Priority Data
Aug. 29, 2012 (CN) .......................... 2012 1 0310417

(51) Int. Cl.
*B32B 7/12* (2006.01)
*B32B 15/04* (2006.01)
*H01F 1/01* (2006.01)
*H01F 41/14* (2006.01)
*C09J 7/00* (2006.01)

(52) U.S. Cl.
CPC . *H01F 1/01* (2013.01); *C09J 7/00* (2013.01); *H01F 41/14* (2013.01); *B32B 2250/00* (2013.01); *Y10T 428/2848* (2015.01)

(58) Field of Classification Search
CPC .................................. H01F 1/01; H01F 41/14
See application file for complete search history.

(56) References Cited

U.S. PATENT DOCUMENTS

| 6,063,209 | A | 5/2000 | Matsutani et al. |
| 2009/0178843 | A1* | 7/2009 | Kato et al. .................... 174/391 |
| 2010/0099365 | A1 | 4/2010 | Aramaki et al. |
| 2010/0156735 | A1* | 6/2010 | Nakamura et al. ........... 343/788 |

FOREIGN PATENT DOCUMENTS

| CN | 1965444 A | 5/2007 |
| CN | 102093577 A | 6/2011 |
| CN | 102129908 A | 7/2011 |
| CN | 102360672 A | 2/2012 |
| EP | 1819211 A1 | 8/2007 |
| EP | 1986200 A1 | 10/2008 |
| EP | 2045285 A1 | 4/2009 |
| JP | 2004052095 A | 2/2004 |

OTHER PUBLICATIONS

Feng, Ze-Kun et al. Preparation of flaky metal magnetic powders and their properties of anti-electromagnetic interferences; J Magn Mater Devices vol. 32, No. 4, p. 41-44. Aug. 2001. (CN).

* cited by examiner

*Primary Examiner* — Victor Chang
(74) *Attorney, Agent, or Firm* — Anova Law Group, PLLC

(57) ABSTRACT

A paste for an NFC magnetic sheet is provided, which comprises: a magnetic powder; an organic carrier; and a nanoscale alumina powder; wherein a weight ratio of the nanoscale alumina powder to the magnetic powder ranges from about 0.0005 to about 0.005. A method of preparing the paste for the NFC magnetic sheet and an NFC magnetic sheet are also provided.

6 Claims, No Drawings

PASTE FOR NFC MAGNETIC SHEET, METHOD OF PREPARING THE SAME, AND NFC MAGNETIC SHEET

CROSS-REFERENCE TO RELATED APPLICATION

This application is a national phase entry under 35 U.S.C. §371 of International Application No. PCT/CN2013/081070, filed on Aug. 8, 2013, which claims the priority to and benefits of Chinese Patent Application Serial No. 201210310417.9, filed with the State Intellectual Property Office of P. R. China on Aug. 29, 2012, the entire contents of which are incorporated herein by reference.

FIELD

The present disclosure generally relates to the field of NFC (near field communication) and, more particularly, relates to a paste for an NFC magnetic sheet, a method of preparing the same, and an NFC magnetic sheet.

BACKGROUND

NFC is a wireless technology started by Philips, then developed by Nokia, Sony, and other manufacturers, which was originally just a combination of remote control identification and network technology. Now, NFC has become an easy, safe, fast communicational wireless connection technology and has played a great role in access control, public transportation, and mobile payment, etc.

NFC chip(s) built in NFC mobile phones may be used as one part of an RFID module, which may be used as passive RFID tags to pay expenses or as RFID reader-writers for data exchange and acquisition.

In the absence of external interference, data can be transmitted, read and written between the electronic tag antenna and the reader-writer by electromagnetic coupling. However, in the practical applications, for example, there are many metal parts in the mobile phones such as batteries and back covers, which may interfere with signals. The metal parts absorb the electromagnetic waves emitted by the reader-writer and then lose them in the form of eddy current, thereby greatly reducing the electromagnetic waves through the electronic tag antenna and resulting in the reduction in the communication distance and sensitivity. Moreover, the electronic tag antenna and the reader-writer may not even work normally. Thus, a wave absorbing magnetic sheet may be attached onto the antenna to absorb lines of magnetic force close to the antenna without passing through the metal parts, so that eddy current losses may not be generated so as to avoid the shortening of the communication distance and the decrease in sensitivity. The wave absorbing magnetic sheet is different from other general wave-absorbing materials. General wave-absorbing materials absorb electromagnetic waves and make electromagnetic energy lost, which requires that the imaginary part of the permeability, i.e. the magnetic loss, is relatively large. However, wave absorbing magnetic sheets for NFC antennas just absorb electromagnetic waves to converge the lines of magnetic force without any loss of the electromagnetic energy, which requires that the real part of the permeability is as large as possible and the imaginary part of the permeability is as small as possible, i.e. the quality factor is high.

To meet the requirements of the flexibility and the miniaturization of electronic devices, the existing NFC composite magnetic sheets are made into thin sheets primarily by casting after magnetic powders are loaded by an organic carrier. The adjustment of the permeability of the magnetic sheet is mainly done on the magnetic powder, for example, by doping or heat treatment. However, when the magnetic powder is determined, it is very hard to increase the real part of the permeability and decrease the imaginary part of the permeability by improving the manufacturing process. For example, both the real part and the imaginary part of the permeability may increase when the density of the magnetic sheet increases, but the quality factor does not necessarily increase.

SUMMARY

The present disclosure is directed to solving at least one of problems in the prior art such as a relatively high magnetic loss of an NFC magnetic sheet.

According to embodiments of the present disclosure, a paste for an NFC magnetic sheet is provided, which comprises: a magnetic powder; an organic carrier; and a nanoscale alumina powder; wherein a weight ratio of the nanoscale alumina powder to the magnetic powder ranges from about 0.0005 to about 0.005.

According to embodiments of the present disclosure, a method of preparing a paste for an NFC magnetic sheet is provided, which comprises steps of: mixing a solvent, an adhesive, a dispersant, and a plasticizer in a predetermined proportion and ball milling or grinding the mixture to obtain a first mixture; adding magnetic powder and nanoscale alumina powder to the first mixture, and continuing ball milling to obtain a second mixture; and adding a defoamer to the second mixture to defoam the second mixture so as to obtain the paste for the NFC magnetic sheet, wherein a weight ratio of the nanoscale alumina powder to the magnetic powder ranges from about 0.0005 to about 0.005.

According to embodiments of the present disclosure, an NFC magnetic sheet obtainable by a process is provided, which comprises steps of: subjecting a paste for NFC magnetic sheets to casting and then drying to obtain a magnetic sheet green body; cutting the magnetic sheet green body to obtain a raw magnetic sheet with a predetermined shape; and laminating the raw magnetic sheet to obtain the NFC magnetic sheet, wherein the paste comprises a magnetic powder, an organic carrier, and a nanoscale alumina powder, in which a weight ratio of the nanoscale alumina powder to the magnetic powder ranges from about 0.0005 to about 0.005.

According to embodiments of the present disclosure, by adding the nanoscale alumina powder within a certain proportion range into the paste for the NFC magnetic sheet, the bridging connection between the magnetic powders is effectively reduced, the resistivity of the magnetic sheet is increased, and the imaginary part of the complex permeability, i.e., the magnetic loss, decreases significantly while the real part of the complex permeability decreases slightly, thus improving the quality factor of the entire magnetic sheet and improving the magnetic conductivity of the magnetic sheet.

DETAILED DESCRIPTION

These and other aspects, solutions and advantages of the disclosure will become apparent and more readily appreciated from the following descriptions.

According to embodiments of the present disclosure, a paste for an NFC magnetic sheet is provided. The paste comprises: a magnetic powder; an organic carrier; and a nanoscale alumina powder; wherein a weight ratio of the nanoscale alumina powder to the magnetic powder ranges from about 0.0005 to about 0.005.

The inventors of the present disclosure have found, after long-time experimentation, that: by adding a nanoscale alumina powder within a certain proportion range into the paste for the NFC magnetic sheet, the imaginary part of the complex permeability, i.e., the magnetic loss, decreases significantly while the real part of the complex permeability decreases slightly, thus increasing the ratio of the real part to the imaginary part of the complex permeability (the quality factor), improving the quality factor of the entire magnetic sheet, and improving the effect of the magnetic conductor of the magnetic sheets. When the weight ratio of the nanoscale alumina powder to the magnetic powder is smaller than 0.005, the quality factor of the magnetic sheet may be improved, but the quality factor of the magnetic sheet is still relatively small. When the weight ratio of the nanoscale alumina powder to the magnetic powder is larger than 0.005, with the continuous adding of the nanoscale alumina powder, the real part of the complex permeability may decrease significantly, while the imaginary part of the complex permeability may decrease slightly, and thus the quality factor of the magnetic sheet may decrease. Therefore, when the weight ratio of the nanoscale alumina powder to the magnetic powder ranges from about 0.0005 to about 0.005, the magnetic sheet has a desirably high quality factor.

In one embodiment, a weight ratio of the magnetic powder and the nanoscale alumina powder to the organic carrier ranges from about 1 to about 1.5. If the content of the organic carrier is too high, the number of magnetic powders per unit volume may decrease, so that the real part of the complex permeability may decrease significantly. If the content of the organic carrier is too low, the number of magnetic powders per unit volume may be too large, so that the bridge connection between the magnetic powders may increase, the resistivity may decrease, and the imaginary part of the complex permeability, i.e., the magnetic loss, may be too high.

In some embodiments of the present disclosure, the above magnetic powder may be a FeSiAl-based magnetic alloy.

In one embodiment, the shape of the magnetic powder is flat. The mixture formed by mixing the flat magnetic powder and the organic carrier may be arranged directionally during the casting process, thus facilitating the increase in the permeability of the magnetic sheet.

In one embodiment, the magnetic powder has a thickness in the range of about 1-5 μm, an aspect ratio in the range of about 1.5-6, an average particle size in the range of about 40-60 μm, and a specific surface area of about 0.8 $m^2$/g. Thus, the flat magnetic powder may be directionally arranged in the organic carrier more easily during the casting process, thus facilitating the increase in the permeability of the magnetic sheet.

In one embodiment, the organic carrier comprises a solvent, an adhesive, a dispersant, a plasticizer and a defoamer. Based on the total weight of the organic carrier, the content of the solvent may be about 75-85 wt %; the content of the adhesive may be about 15-20 wt %; the content of the dispersant may be about 0.1-1 wt %; the content of the plasticizer may be about 1-5 wt %; and the content of the defoamer may be about 0.1-1 wt %.

The solvent may be various kinds of known volatile organic solvents. For example, the solvent may be selected from the group consisting of toluene, xylene, ethanol, ethyl acetate, acetone, and combinations thereof, but is not limited thereto. In an embodiment of the disclosure, the solvent is a mixed solvent of toluene and ethanol.

In some embodiments, the defoamer is selected from the group consisting of n-butanol, a polyether-modified silicon defoamer, and combinations thereof. The defoamer may be, for example, used to eliminate air bubbles in the paste.

In some embodiments, the dispersant is selected from the group consisting of hydrogenated castor oil, polyethylene glycol, methyl amyl alcohol, and combinations thereof. The dispersant is used to make the components in the paste system dispersed uniformly.

In some embodiments, the plasticizer is selected from the group consisting of terpineol, dibutyl phthalate, tributyl citrate, epoxy butyl oleate, and combinations thereof. The plasticizer is used to reduce the stress between the molecular chains of the adhesive and increase the mobility of the molecular chains, so that the entire NFC magnetic sheet may exhibit desired flexibility.

In some embodiments, the nanoscale alumina powder is α-alumina with a purity of more than about 99%.

In some embodiments, the nanoscale alumina powder is a spherical powder with a particle size of about 10 nm to about 50 nm and a specific surface area of about 90 $m^2$/g to about 130 $m^2$/g.

A method of preparing the paste for the NFC magnetic sheet described above is also provided. The method comprises steps of: mixing the solvent, the adhesive, the dispersant, and the plasticizer in a predetermined proportion and ball milling or grinding the mixed materials to obtain a first mixture; adding the magnetic powder and the nanoscale alumina powder to the first mixture, and continuing ball milling to obtain a second mixture; and adding a defoamer to the second mixture for defoaming so as to obtain the paste for the NFC magnetic sheet, wherein a weight ratio of the nanoscale alumina powder to the magnetic powder is in the range of about 0.0005-0.005.

Generally, the components are directly mixed evenly to prepare the paste for the NFC magnetic sheet. In the present disclosure, in order to ensure the uniform dispersion of the magnetic powder, the nanoscale alumina powder and the organic carrier, a solid powder adhesive and other auxiliaries (such as the dispersant and the plasticizer) are dispersed into the solvent to form an organic solution system, which is ball milled uniformly to obtain the first mixture; and then the magnetic powder and the nanoscale alumina powder are mixed with the first mixture, and ball milling is continued to obtain the second mixture; and finally the defoamer is added to the second mixture for defoaming so as to obtain the paste.

In one embodiment, in the step of preparing the first mixture, the ball milling is performed at a rotation speed of about 300 to 450 r/min (revolutions per minute) for about 1 to 2 hours. In one embodiment, in the step of preparing the second mixture, the ball milling is performed at a rotation speed of about 300 to 450 r/min for about 3 to 8 hours.

In one embodiment, the foaming is preferably vacuum defoaming. More preferably, the vacuum defoaming is performed under a vacuum degree ranging from about −0.05 MPa to about −0.1 MPa at a rotation speed ranging from about 50 r/min to about 75 r/min for about 3 hours to about 6 hours.

An NFC magnetic sheet obtainable by a process is also provided. The process comprises steps of: subjecting the above-mentioned paste to casting and drying to obtain a magnetic sheet green body; cutting the magnetic sheet green body to obtain a raw sheet with a predetermined shape; and laminating the raw magnetic sheet to obtain the NFC magnetic sheet.

In one embodiment, specifically, the casting step is performed on a casting machine, which is known to those skilled in the art. Preferably, in the casting step, the height of a scraper ranges from about 0.1 meters to about 1.0 meter, and the speed ranges from about 8 m/min to about 15 m/min. After the casting step, a magnetic thin sheet is obtained, which is dried to remove the volatile components like the solvent in the organic carrier. Preferably, the drying is performed at a temperature in the range of about 80 to 150° C. for about 1.5 to 4 hours.

In one embodiment, in the laminating step, the pressure is about 30 to 50 kg/cm$^2$ and is maintained for about 30 to 240 seconds.

In one embodiment, after the laminating step, the method further comprises covering one surface of the NFC magnetic sheet with a polyester film, and covering the other surface of the NFC magnetic sheet with a double-sided adhesive tape. By covering one surface of the NFC magnetic sheet with the polyester film, the contact area between the magnetic sheet and the water vapor in the air may be reduced, the physical scratches during the use may be reduced, and the life of the NFC magnetic sheet may be prolonged. More preferably, the polyester used in the polyester film is polyethylene terephthalate (PET).

The aforementioned features and advantages of the present disclosure as well as the additional features and advantages thereof will be further understood hereafter as a result of a detailed description of the following embodiments.

Unless otherwise defined, all technical and scientific terms used herein have the same meaning as commonly understood by one of ordinary skill in the art to which this disclosure belongs. In case of conflict, the specification, including definitions, will control.

Example 1

Formulation of Paste for NFC Magnetic Sheet

With respect to 100 parts by weight of a magnetic powder, the amount of a nanoscale alumina powder is 0.1 parts by weight. With respect to 100 parts by weight of the magnetic powder and the nanoscale alumina powder, the amount of an organic carrier is 80 parts by weight.

Formulation of Organic Carrier

Based on the total weight of the organic carrier, the organic carrier comprises 3.37 parts by weight of polyvinyl butyral (PVB) (adhesive), 13.47 parts by weight of ethyl cellulose (adhesive), 49.67 parts by weight of toluene (solvent), 29.68 parts by weight of ethanol (solvent), 0.56 parts by weight of n-butanol (defoamer), 0.73 parts by weight of hydrogenated castor oil (dispersant), and 2.52 parts by weight of terpineol (plasticizer).

Fabrication Process

The respective raw materials were weighted according to the above formulation. Various organic substances of the organic carrier were mixed, placed into a planetary ball mill, and ball milled at a rotation speed of 400 r/min for 1 hour to obtain a first mixture. Then, the FeSiAl-based magnetic powder and the nanoscale alumina powder were added to the first mixture, and ball milling was continued at a rotation speed of 400 r/min for 3 hours to obtain a second mixture. The second mixture was defoamed in a vacuum defoaming machine under a vacuum degree of −0.09 MPa at a rotation speed of 70 r/min for 3 hours to obtain a paste for NFC magnetic sheet. The paste was subjected to a casting process on a casting machine with a scraper height of 0.8 mm and a speed of 10 m/min to obtain a casted sheet. The casted sheet was dried in an oven at 100° C. for 2 hours to obtain a magnetic sheet green body. The magnetic sheet green body was cut by a cutting press to obtain a raw magnetic sheet with a desired shape. The raw magnetic sheets were laminated in a mould under a pressure of 35 kg/cm2 for 120 seconds to obtain an NFC magnetic sheet. A PET film was attached onto one surface of the NFC magnetic sheet. A double-sided adhesive tape was attached onto the other surface of the NFC magnetic sheet to obtain an NFC magnetic sheet A.

Example 2

Formulation of Paste for NFC Magnetic Sheet

With respect to 100 parts by weight of a magnetic powder, the amount of a nanoscale alumina powder is 0.05 parts by weight. With respect to 100 parts by weight of the magnetic powder and the nanoscale alumina powder, the amount of an organic carrier is 80 parts by weight.

Formulation of Organic Carrier

Based on the total weight of the organic carrier, the organic carrier comprises 3.37 parts by weight of polyvinyl butyral (PVB) (adhesive), 13.47 parts by weight of ethyl cellulose (adhesive), 49.67 parts by weight of toluene (solvent), 29.68 parts by weight of ethanol (solvent), 0.56 parts by weight of n-butanol (defoamer), 0.73 parts by weight of hydrogenated castor oil (dispersant), and 2.52 parts by weight of terpineol (plasticizer).

The production process of an NFC magnetic sheet B is the same as that in Example 1.

Example 3

Formulation of Paste for NFC Magnetic Sheet

With respect to 100 parts by weight of a magnetic powder, the amount of a nanoscale alumina powder is 0.5 parts by weight. With respect to 100 parts by weight of the magnetic powder and the nanoscale alumina powder, the amount of an organic carrier is 80 parts by weight.

Formulation of Organic Carrier

Based on the total weight of the organic carrier, the organic carrier comprises 3.37 parts by weight of polyvinyl butyral (PVB) (adhesive), 13.47 parts by weight of ethyl cellulose (adhesive), 49.67 parts by weight of toluene (solvent), 29.68 parts by weight of ethanol (solvent), 0.56 parts by weight of n-butanol (defoamer), 0.73 parts by weight of hydrogenated castor oil (dispersant), and 2.52 parts by weight of terpineol (plasticizer).

The production process of an NFC magnetic sheet C is the same as that in Example 1.

Example 4

Formulation of Paste for NFC Magnetic Sheet

With respect to 100 parts by weight of a magnetic powder, the amount of a nanoscale alumina powder is 0.1 parts by weight. With respect to 100 parts by weight of the magnetic powder and the nanoscale alumina powder, the amount of an organic carrier is 100 parts by weight.

Formulation of Organic Carrier

Based on the total weight of the organic carrier, the organic carrier comprises 3.37 parts by weight of polyvinyl butyral (PVB) (adhesive), 13.47 parts by weight of ethyl cellulose (adhesive), 49.67 parts by weight of toluene (solvent), 29.68 parts by weight of ethanol (solvent), 0.56 parts by weight of n-butanol (defoamer), 0.73 parts by weight of hydrogenated castor oil (dispersant), and 2.52 parts by weight of terpineol (plasticizer).

The production process of an NFC magnetic sheet D is the same as that in Example 1.

Example 5

Formulation of Paste for NFC Magnetic Sheet

With respect to 100 parts by weight of a magnetic powder, the amount of a nanoscale alumina powder is 0.1 parts by weight. With respect to 100 parts by weight of the magnetic powder and the nanoscale alumina powder, the amount of an organic carrier is 66.7 parts by weight.

Formulation of Organic Carrier

Based on the total weight of the organic carrier, the organic carrier comprises 3.37 parts by weight of polyvinyl butyral (PVB) (adhesive), 13.47 parts by weight of ethyl cellulose (adhesive), 49.67 parts by weight of toluene (solvent), 29.68 parts by weight of ethanol (solvent), 0.56 parts by weight of n-butanol (defoamer), 0.73 parts by weight of hydrogenated castor oil (dispersant), and 2.52 parts by weight of terpineol (plasticizer).

The production process of an NFC magnetic sheet E is the same as that in Example 1.

Comparative Example 1

Formulation of Paste for NFC Magnetic Sheet

No nanoscale alumina powder was added. With respect to 100 parts by weight of the magnetic powder and the nanoscale alumina powder, the amount of an organic carrier is 80 parts by weight.

Formulation of Organic Carrier

Based on the total weight of the organic carrier, the organic carrier comprises 3.37 parts by weight of polyvinyl butyral (PVB) (adhesive), 13.47 parts by weight of ethyl cellulose (adhesive), 49.67 parts by weight of toluene (solvent), 29.68 parts by weight of ethanol (solvent), 0.56 parts by weight of n-butanol (defoamer), 0.73 parts by weight of hydrogenated castor oil (dispersant), and 2.52 parts by weight of terpineol (plasticizer).

The production process of a magnetic sheet F is the same as that in Example 1.

Comparative Example 2

Formulation of Paste for NFC Magnetic Sheet

With respect to 100 parts by weight of a magnetic powder, the amount of a nanoscale alumina powder is 0.005 parts by weight. With respect to 100 parts by weight of the magnetic powder and the nanoscale alumina powder, the amount of an organic carrier is 80 parts by weight.

Formulation of Organic Carrier

Based on the total weight of the organic carrier, the organic carrier comprises 3.37 parts by weight of polyvinyl butyral (PVB) (adhesive), 13.47 parts by weight of ethyl cellulose (adhesive), 49.67 parts by weight of toluene (solvent), 29.68 parts by weight of ethanol (solvent), 0.56 parts by weight of n-butanol (defoamer), 0.73 parts by weight of hydrogenated castor oil (dispersant), and 2.52 parts by weight of terpineol (plasticizer).

The production process of a magnetic sheet G is the same as that in Example 1.

Comparative Example 3

Formulation of Paste for NFC Magnetic Sheet

With respect to 100 parts by weight of a magnetic powder, the amount of a nanoscale alumina powder is 0.85 parts by weight. With respect to 100 parts by weight of the magnetic powder and the nanoscale alumina powder, the amount of an organic carrier is 80 parts by weight.

Formulation of Organic Carrier

Based on the total weight of the organic carrier, the organic carrier comprises 3.37 parts by weight of polyvinyl butyral (PVB) (adhesive), 13.47 parts by weight of ethyl cellulose (adhesive), 49.67 parts by weight of toluene (solvent), 29.68 parts by weight of ethanol (solvent), 0.56 parts by weight of n-butanol (defoamer), 0.73 parts by weight of hydrogenated castor oil (dispersant), and 2.52 parts by weight of terpineol (plasticizer).

The production process of a magnetic sheet H is the same as that in Example 1.

Performance Test

The magnetic sheet A was cut into three identical circular rings with an outer diameter of 19 mm and an inner diameter of 5.4 mm by a laser cutting machine. A computer was connected with a test fixture by a network analyzer (Agilent E5701c, 9 k-4.5 G), and then the circular rings were placed into the test fixture to test the complex permeability $\mu$, $\mu=\mu'+i\mu''$, where $\mu'$ is the real part of the complex permeability, $\mu''$ is the imaginary part of the complex permeability. The quality factor $Q=\mu'/\mu''$. Then, the average values of the real part and the imaginary part of the complex permeability were recorded.

The magnetic sheets B-H were tested by the same method as the magnetic sheet A. The results were listed in Table 1.

TABLE 1

| | Test Results | | |
|---|---|---|---|
| sample | real part of complex permeability ($\mu'$) | imaginary part of complex permeability ($\mu''$) | quality factor (Q) |
| A | 31.5 | 0.7 | 45.0 |
| B | 31.6 | 0.8 | 39.5 |
| C | 28.3 | 0.7 | 40.4 |
| D | 31.4 | 0.7 | 44.9 |
| E | 31.6 | 0.8 | 39.5 |
| F | 31.7 | 1.9 | 16.7 |
| G | 31.6 | 1 | 31.6 |
| H | 27.1 | 0.7 | 38.7 |

It should be noted that: when used in NFC, the magnetic sheet with a relatively large $\mu'$ and Q value and a relatively small $\mu''$ is preferably selected to effectively reduce the eddy current losses generated by the near-field communication and improve the communication performance.

It can be seen from the results that, with the magnetic sheets A-C according to Examples 1-3 of the present disclosure, when the parts by weight of the organic carriers in the pastes are the same and the parts by weight of nanoscale alumina powder are reduced, a bridging connection between the magnetic powders increases, the resistivity of the magnetic sheet decreases, and the imaginary part μ" of the complex permeability increases to a large extent while the real part μ' of the complex permeability increases to a small extent, i.e., the magnetic loss is relatively high, thus resulting in the reduction of the quality factor of the magnetic sheet. Accordingly, when the content of the nanoscale alumina powder in the paste is increased, the bridging connection between the magnetic powders decreases, the resistivity of the magnetic sheet increases, and the imaginary part μ" of the complex permeability reduces to a large extent while the real part μ' of the complex permeability decreases to a small extent, so that the quality factor increased.

It can be seen from the results that, with the magnetic sheets A, D, E according to Examples 1, 4, 5 of the present disclosure, when the parts by weight of the magnetic powder and the nanoscale alumina powder are the same and the parts by weight of the organic carrier increases, the content per unit volume of the magnetic powder and the nanoscale alumina powder in the magnetic sheet decreases, the real part μ' of the complex permeability decreases slightly, and the imaginary part μ" of the complex permeability is almost unchanged, so that the quality factor decreases slightly. When the parts by weight of the magnetic powder and the nanoscale alumnnina powder are the same and the parts by weight of the organic carrier decreases, the content per unit volume of the magnetic powder and the nanoscale alumina powder in the magnetic sheet increases, the real part μ' of the complex permeability increases slightly, and the imaginary part μ" of the complex permeability increases, so that the quality factor decreases slightly.

It can be seen from the results that, in Comparative Examples 1-2, when no nanoscale alumina powder is added or the amount of the nanoscale alumina powder is smaller than a predetermined minimum value (e.g., 0.0005 part by weight with respect to 1 part by weight of magnetic powder), the real part μ' of the complex permeability increases slightly, while the imaginary part μ" of the complex permeability increases largely due to the bridging connection between the magnetic powders and the low resistivity of the magnetic sheet, so that the quality factor of the magnetic sheet decreases.

It can be seen from the results that, in Comparative Example 3, when the amount of the nanoscale alumina powder is larger than a predetermined maximum value (e.g., 0.005 part by weight with respect to 1 part by weight of magnetic powder), the real part μ' of the complex permeability decreases significantly, while the imaginary part μ" of the complex permeability decreases slightly, so that the quality factor of the magnetic sheet decreases.

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A paste for an NFC magnetic sheet, comprising:
   a magnetic powder;
   an organic carrier in a form of a mixture of a plurality of materials; and
   a nanoscale alumina powder;
   wherein the magnetic powder and the nanoscale alumina powder is uniformly mixed in the mixture of the organic carrier, a weight ratio of the nanoscale alumina powder to the magnetic powder ranges from about 0.0005 to about 0.005, and a weight ratio of a summation of the magnetic powder and the nanoscale alumina powder to the organic carrier ranges from about 1 to about 1.5.

2. The paste of claim 1, wherein:
   the magnetic powder is a FeSiAl-based magnetic alloy.

3. The paste of claim 1, wherein the magnetic powder has a thickness in the range of about 1 μm to about 5 μm, an aspect ratio in the range of about 1.5 to about 6, an average particle size in the range of about 40 μm to about 60 μm, and a specific surface area of about 0.8 m$^2$/g.

4. The paste of claim 1, wherein the organic carrier comprises a solvent, an adhesive, a dispersant, a plasticizer and a defoamer; and based on the total weight of the organic carrier, the organic carrier comprises about 75 wt % to about 85 wt % of the solvent, about 15 wt % to about 20 wt % of the adhesive, about 0.1 wt % to about 1 wt % of the dispersant, about 1 wt % to 5 wt % of the plasticizer, and about 0.1 wt % to 1 wt % of the defoamer.

5. The paste of claim 1, wherein the nanoscale alumina powder is .alpha.-alumina with a purity of more than about 99%.

6. The paste of claim 1, wherein the nanoscale alumina powder is a spherical powder with a particle size of about 10 nm to about 50 nm and a specific surface area of about 90 m$^2$/g to about 130 m$^2$/g.

* * * * *